United States Patent
Shah et al.

(10) Patent No.: US 7,472,141 B1
(45) Date of Patent: Dec. 30, 2008

(54) SYSTEM AND METHOD FOR CONTROLLING OFF-HOST POLICIES

(75) Inventors: Aalop S. Shah, Pune (IN); Basant A/L R. P. Rajan, Pune (IN); Milind V. Borate, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 261 days.

(21) Appl. No.: 11/353,786

(22) Filed: Feb. 14, 2006

(51) Int. Cl.
*G06F 17/30* (2006.01)

(52) U.S. Cl. .................. 707/204; 707/200; 707/202; 707/100

(58) Field of Classification Search .............. 707/100, 707/101, 103 Y, 200, 202, 204; 711/162
See application file for complete search history.

(56) References Cited

U.S. PATENT DOCUMENTS

| | | | |
|---|---|---|---|
| 6,279,011 B1 * | 8/2001 | Muhlestein | 707/204 |
| 6,714,952 B2 * | 3/2004 | Dunham et al. | 707/204 |
| 6,950,836 B2 * | 9/2005 | Lohn et al. | 707/204 |
| 7,240,079 B2 * | 7/2007 | Markkanen | 707/204 |
| 2007/0220309 A1 * | 9/2007 | Andre et al. | 714/6 |

OTHER PUBLICATIONS

Rowan, Michael; "Achieving Atomic Database Recovery," Revivio; 12 Hartwell Avenue; Lexington, Massachusetts, 02421; 2005; pp. 1-8.

* cited by examiner

*Primary Examiner*—Cam-Linh Nguyen
(74) *Attorney, Agent, or Firm*—Campbell Stephenson, LLP

(57) ABSTRACT

A method for performing data backup operations may involve copying data to be archived from a source system and copying file properties from the source system. The file properties may include archiving properties for at least one data file among the copied data. The data file may then be archived in accordance with the archiving properties. The copied data may be copied from a first host onto a second host. The file properties may also be copied from the first host onto the second host. The file properties may be stored as file attributes or metadata on the source system and may be copied to an archiving server along with the file. Additionally, a method for performing off-host processing of data may involve copying data to be processed from a source system, copying processing instructions from the source system and processing the copied data according to the copied processing instructions.

21 Claims, 5 Drawing Sheets

SYSTEM AND METHOD FOR CONTROLLING OFF-HOST POLICIES

FIELD OF THE INVENTION

This invention relates to off-host data processing, and more particularly, to off-host data archiving techniques.

DESCRIPTION OF THE RELATED ART

Data archiving and disaster recovery procedures are an important aspect of an information technology environment. The ready ability for a business to store, process and transmit data is a facet of operations that a business relies upon to conduct its day-to-day activities. For businesses that increasingly depend upon data for their operations, an inability to store, process, or transmit data can hurt reputation and bottom line. Businesses are therefore taking measures to improve their ability to store, process and transmit data and also to restore data when needed.

The ever-increasing reliance on data and the computing systems that produce, process, distribute and maintain data in its myriad forms continues to put great demands on techniques for data protection. Simple systems providing periodic backups of data have, given way to more complex and sophisticated data protection schemes that take into consideration a variety of factors, including the wide variety of computing devices and platforms, the numerous different types of data that must be protected, the speed with which archiving operations must be executed and the flexibility demanded by today's users.

In many cases, disaster recovery involves restoring data to a point in time when the pertinent data was in a known and valid state. Various backup schemes exist to ensure the recoverability of data as it existed at times in the past. Such schemes have traditionally included periodic full backups followed by a series of differential backups performed at intervals between the full backups. In such a manner, collections of data can be restored at least to a point in time of a differential backup.

Another technique that may also be used for archiving data is the use of continuous data protection (CDP) tools. CDP tools may be used to create backup copies of data on a network's hosts as changes are made to the data and may generally also enable administrators and end users to execute quick recoveries of lost data. Various CDP tools may be designed to enhance the ability to recover data that was recently saved prior to the data loss. CDP tools may be configured to record each change to data as the change is made. Other versions of CDP tools (which may be called "near-CDP tools") may not provide this atomic level of detail, but may instead record full or incremental snapshots of data at various points in time. The ability to recover a particular version of data may then depend on the frequency with which the snapshots were recorded. Using CDP tools, administrators or users may recover files and other data such as e-mail from any (or almost any) point in time. This advantage may be helpful in that it allows recovery not only from equipment failures that destroy data, but also recovery from logical failures (user error or configuration errors) that may also destroy or damage data during the normal operation of a system. A user may use CDP tools to identify and recover the most recent version of data that existed prior to corruption or loss by a logical failure.

Other techniques may also be used to provide robust data archiving, such as the use of off-site storage and redundant archives. Additionally, some files may be archived more frequently than others (hourly/daily/weekly/monthly), or may be archived incrementally rather than with full backups of the file. Such choices may be based, for example, on the frequency with which a user expects a file to be updated, or on the user's perceived value of a file.

The archiving operations are often managed by an off-host backup server. This off-host server may generally be a separate computing system from the data processing hosts and may copy files from the various data processing hosts through network links to store backup copies of the files. The various choices regarding archiving options for different files may be specified by an administrator of the off-host backup server. The administrator may form archiving policies in response to suggestions and requests from users of the various files on the hosts. The administrator may then configure the backup server to access the hosts according to these archiving policies and to perform archiving functions on the files as specified by the policies.

A challenge in forming the archiving policies arises in the effort needed to inform the backup administrator of the desired archiving policies. In general, a user may communicate with the administrator via a telephone conversation or an email message to indicate the desired archiving policies for one or more files (e.g., the names of the files to be backed up, the frequency of the backup operation, the desired storage medium, whether CDP backups are desired, any desired CDP settings and other options). The administrator must then configure the backup servers with the appropriate policy settings for these files. This task may be especially cumbersome in an environment where one or a few backup administrators support a large number of users. When a user creates new files or wishes to modify the archiving policies, the user may again need to contact the administrator so that the new or modified policies may be implemented. In addition to any inconvenience experienced by users, the process of updating archiving policies may also prove cumbersome for administrators and may lead to insecure data in situations where administrators have a backlog of policy updates that need to be configured into backup servers.

Accordingly, it could be helpful to have a backup server that may be more readily configured with archiving policies. For example, a backup server that can be quickly updated with revised archiving policies would be advantageous. Similarly, a procedure to simplify the communication of archiving policies would also be valuable.

SUMMARY

Various embodiments of methods and systems for performing data backup operations are disclosed. In one embodiment, a method involves copying data to be archived from a source system and copying file properties from the source system. The file properties include archiving properties for at least one data file among the copied data. The data file is then archived in accordance with the archiving properties. The copied data may be copied from a first host onto a second host. The file properties may also be copied from the first host onto the second host. The file properties may be stored as file attributes or metadata of the data file on the source system.

Additionally, a method for performing off-host processing of data may involve copying data to be processed from a source system and copying processing instructions from the source system. The copied data and processing instructions may be copied from a first host onto a second host. The copied data may then be processed on the second host in accordance with the copied processing instructions.

One embodiment of a system includes a host, a backup server and an archiving module. The host includes a first processor and a first memory. The backup server includes a second processor and a second memory and is coupled to the host and to the backup server. The archiving module is configured to archive data from the first memory onto the second memory in accordance with archiving policies maintained in the first memory. The archiving policies for a file may be stored among file attributes of the file in the first memory. The archiving module may be configured to copy the file attributes from the first host onto the backup server as a part of copying the file from first host onto the backup server.

The foregoing is a summary and thus contains, by necessity, simplifications, generalizations and omissions of detail; consequently those skilled in the art will appreciate that the summary is illustrative only and is not intended to be in any way limiting. Other aspects, inventive features and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
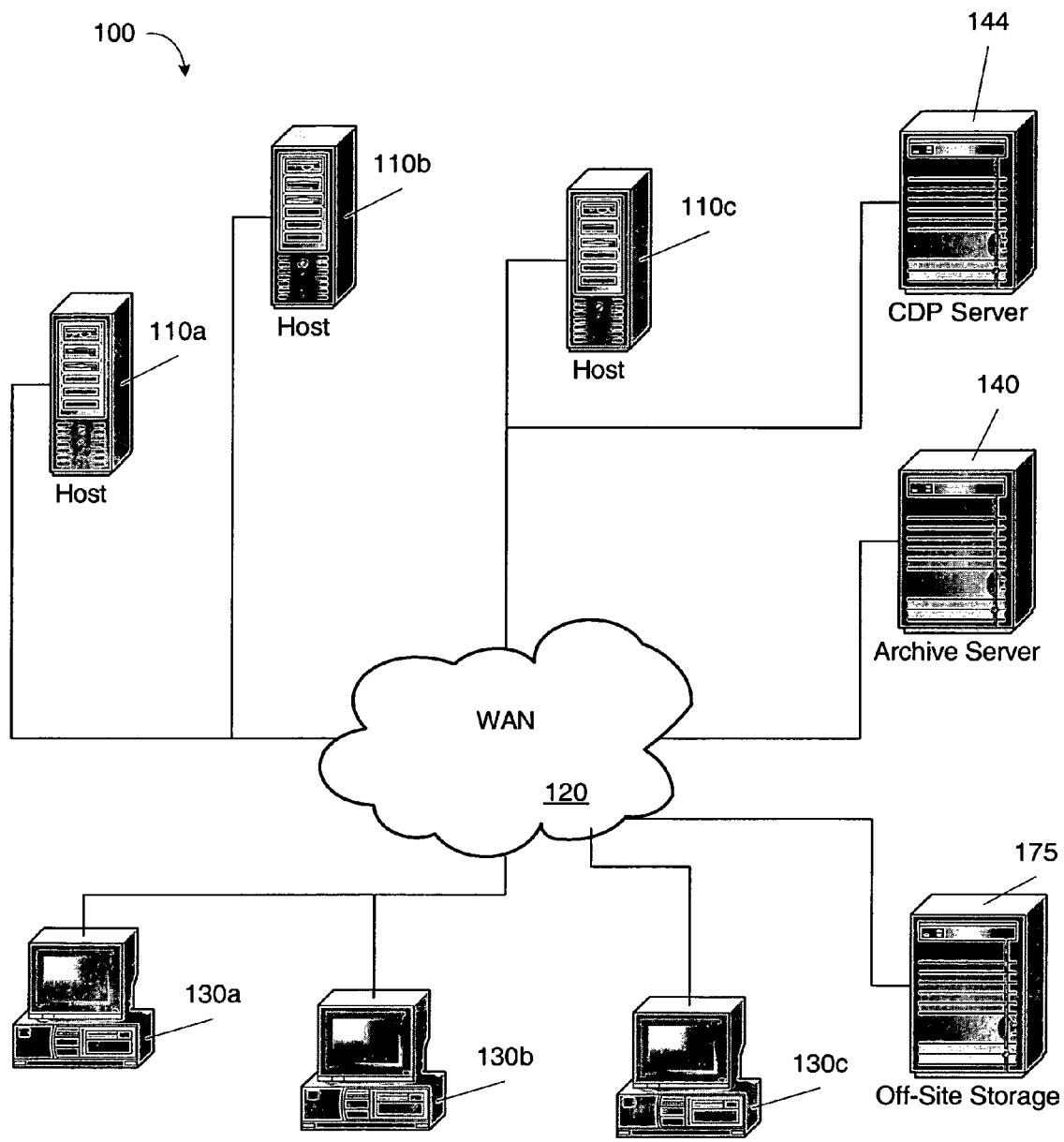
FIG. 1 is a block diagram of one implementation of a network system configured with tools for facilitating the archiving of data.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of one implementation of a network system 100 configured with tools for facilitating the archiving of data. The system 100 includes several hosts 110*a*, 110*b* and 110*c*. In the illustrated example, the hosts 110*a* and 110*b* are at a common location and the host 110*c* is at a different second location. The hosts may execute a variety of applications to provide various types of hosting and data-processing capabilities to clients. The hosts 110*a-c* may be coupled to a wide area network (WAN) 120, such as the Internet, and may be accessible to various clients 130*a*, 130*b* and 130*c* through the WAN.

Servers may also be coupled through the WAN (and/or through a local area network (LAN) and/or through a storage area network (SAN)) to various storage devices. For example, an archive server 140 may be used as a repository for application data. Archiving functions may also be performed by an off-site storage server 175 and a continuous data protection (CDP) server 144 that are also coupled to the WAN 120. The CDP server 144 may be used to archive ongoing modifications to some or all of the files stored on the various hosts 110*a-c*. The off-site storage server 175 may keep a copy of some or all data at a remote location and may be used to provide security against fire or other site-based hazards.

Figure 2:
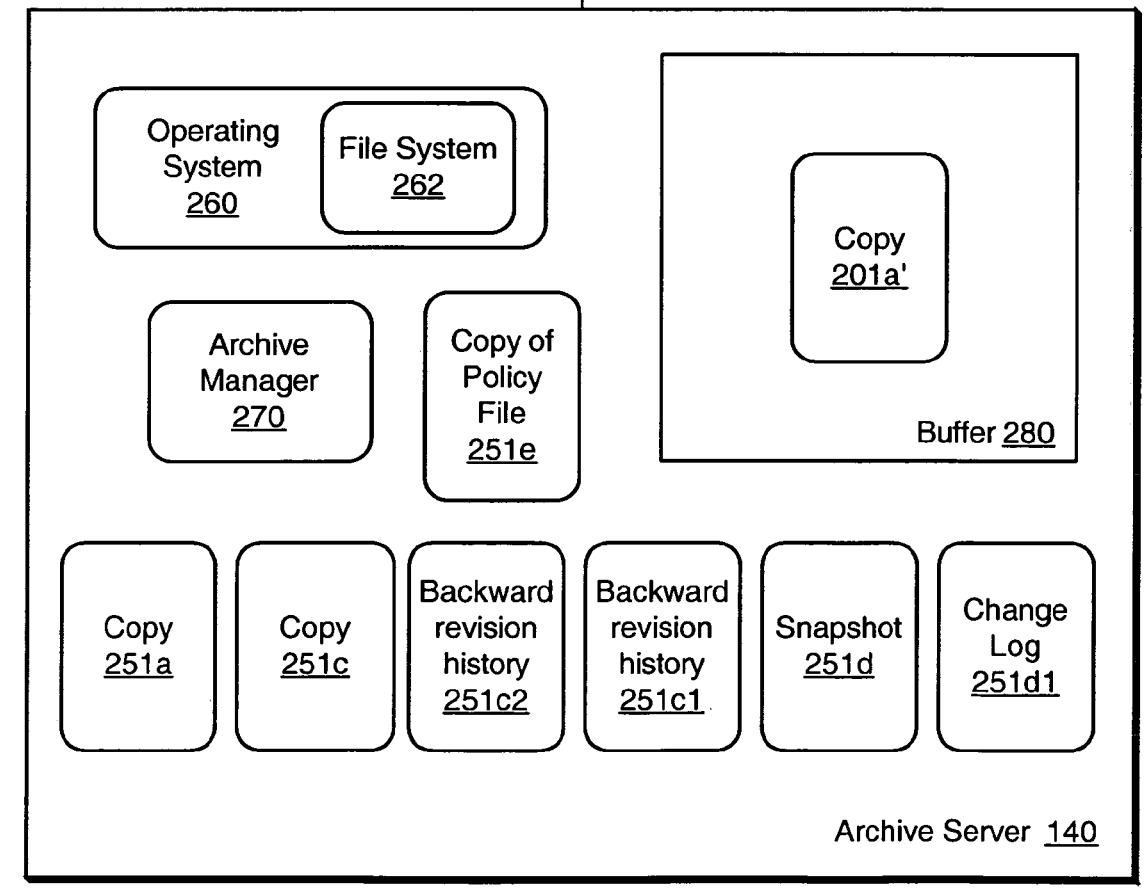
FIG. 2 is a block diagram of one implementation of a host and an archive server.

FIG. 2 is a block diagram of one implementation of the host 110*a* and the archive server 140. The archive server 140 may perform backup operations on information stored on the host 110*a* according to techniques described below. The host 110*a* is depicted as including an operating system 210 and a file system 212. The file system 212 may be considered a component of the operating system 210. The host 110*a* may also include applications 220 that may be executed on the host and several files 201*a*-201*e* (collectively identified as files 201) that are stored on the host 110*a*.

The file system 212 may carry out the management of the files 201*a*-201*e* on the host 110*a*. For example, the file system 212 may oversee the storage of the files on local or remote storage media. The file system 212 may also manage the file attributes that are part of (or associated with) the files. These attributes may include information such as file names and user access privileges, among others.

The archive server 140 is depicted as including an operating system 260, a file system 262 and an archive manager 270. The archive manager 270 may be an application or combination of applications that is executed on the archive server 140. Instead, or in addition, the archive manager 270 may include components that are incorporated into the operating system 260. The archive server 140 may also include a buffer 280 and several archival files 251*a*, 251*c*, 251*c*2, 251*c*1, 251*d*, 251*d*1 and 251*e* (collectively identified as archives 251) that serve as backups of the files 201 on the host 110*a*.

The archive manager 270 may be configured to create the archives 251 by copying the files 201 from the host 110*a* onto the archive server 140. The copies may be made by accessing the host 110*a* through a network connection, reading the files 201 from the host 110*a* and creating "off-host" copies of the files on the archive server 140. Various approaches may be used to mirror or replicate the files 201 onto the archive server 140. The appropriate archiving policies may then be applied to the off-host copies of the files to generate the archives 251.

The archive manager 270 may initially copy the files 201 from the host 110*a* into the buffer 280. This copying may be performed on an ongoing basis, copying one file at a time from the host 110*a*. For example, the buffer 280 is illustrated as holding a recently obtained off-host copy 201*a*' of the file 201*a*. The copying may be sequential, obtaining in turn each of the files available on the host 110*a*. Alternatively, the copying may select files as needed according to the specified archiving policies for the various files.

Instead of copying the files one at a time, the copying may be performed on more than one file at a time, or on only a portion of a file at a time. The copying procedure may be adapted according to the size of a file being addressed and may also depend on the available memory in the buffer 280. The copying procedure may also be performed on a block basis, such as in situations where the storage device is a block-level archiving appliance. For example, the archive server 140 may perform the copying block-by-block as various blocks are modified on the host 110*a*.

Having obtained the recent off-host copy 201*a*' of a file, the archive manager 270 on the archive server 140 may then apply the appropriate policy for the file so that the recent off-host copy may be added to the archives 251. In order to do this, however, the archive manager 270 needs to be aware of the relevant archiving policy.

As discussed above, a user of the host 110*a* may communicate the desired archiving policies to the archive server 140 though an administrator who may then manually enter the policies into the archive server 140. To streamline this procedure, it is contemplated that a graphical user interface (GUI) may be implemented on the archive server 140, so that the user may remotely access this GUI and enter the desired policy through the GUI. However, the approach of using a GUI may also introduce complications. For example, the various users may need to learn one or more GUIs in order to properly use various off-host remote storage services. Additionally, an authentication scheme may be need to be deployed on the archive servers—and among the users—to ensure the security of the archive servers.

An alternative approach to obtaining the archiving policies for the files is to have the archiving policies stored in a policy file 201e among the files 201 that are being archived. This policy file can then be copied, in turn, onto the archive server 140 by the archive manager 270. The archive manager 270 may thus obtain an off-host copy of the policy file 251e. The archiving policies may then be read from the off-host copy of the policy file 251e, so that the archive manager 270 can determine appropriate steps to be taken with the off-host copies of the files (or portions of files, or blocks) as they arrive in the buffer 280.

As depicted in FIG. 2, the archives may be formed based on various policies specified in the copy of the policy file 251e. For example, the archives 251 includes the archival file 251a, illustrating a policy in which only a single archival copy is maintained on the archive server 140 for the file 201a on the host 110a.

The archives 251 include no copies of the file 201b, illustrating a "no archive" policy for this file. It is also contemplated that the archiving policies may dictate that more than one copy of a file be maintained on the archive server 140, so that one or more past versions of the file can be preserved.

However, a more efficient approach to preserving such historical information may be to store one (or more) versions of a file along with records of incremental changes to those versions. Two implementations of this approach are indicated in the illustrated example for files 201c and 201d. For file 201c, the copy of the policy file 251e specifies that one current copy 251c is maintained on the archive server 140, along with two log files 251c1 and 251c2. The log files 251c1 and 251c2 hold revision history that may be used to reconstruct past versions of the file 201c, reaching further backward in time as successive instructions from the logs are applied to the current copy 251c.

A complimentary approach is used for file 201d. For file 201d, the copy of the policy file 251e specifies that one old copy 251d is maintained on the archive server 140. This old copy may be understood as a "snapshot" of a past version of the file 201d. Along with the snapshot, the copy of the policy file 251e specifies that the archive manager 270 also maintains one log file 251d1. The log file 251d1 may store a historical record of recent changes to the file 201d, reaching forward in time since the creation of the snapshot 251d. The log file 251d1 may hold revision history that may be used to reconstruct past versions of the file, reaching further forward in time as successive instructions from the log are applied to the old snapshot 251d.

By obtaining updated versions of the policy file 201e, the archive server 140 may learn of changes in the desired archive policies. For example, if a user of the host 110a wishes to change the archive policy for the file 201a, the user may edit the policy file 201e to reflect the new archive policy for file 201a. The user may thus enter the update locally, on the host 110a and may perform the update without needing to access the archive server 140.

When the archive server 140 subsequently obtains a fresh copy of the policy file 201e, this fresh copy may then replace the previous off-host copy of the policy file 251e. The archive manager 270 can then subsequently perform archiving according to the new policies indicated in the updated copy of the policy file 251e and may thus effect the updated archive policies, as desired by the user for file 201a.

The policies in the off-host copy of the policy file 251e may also indicate how often a fresh version of the policy file 201e should be obtained from the host 110a. For example, it may be desirable to obtain frequent updates (or to check fairly frequently for updates) of the policy file 201e, so that any desired or crucial updates may take effect quickly. As with other archive policies, the archive policies for the policy file 201e may be updated by editing the policy file 201e.

Yet other implementations of the system 100 may use alternative approaches to transmitting the archive policy information. One such alternative is illustrated in FIG. 3.

Figure 3:
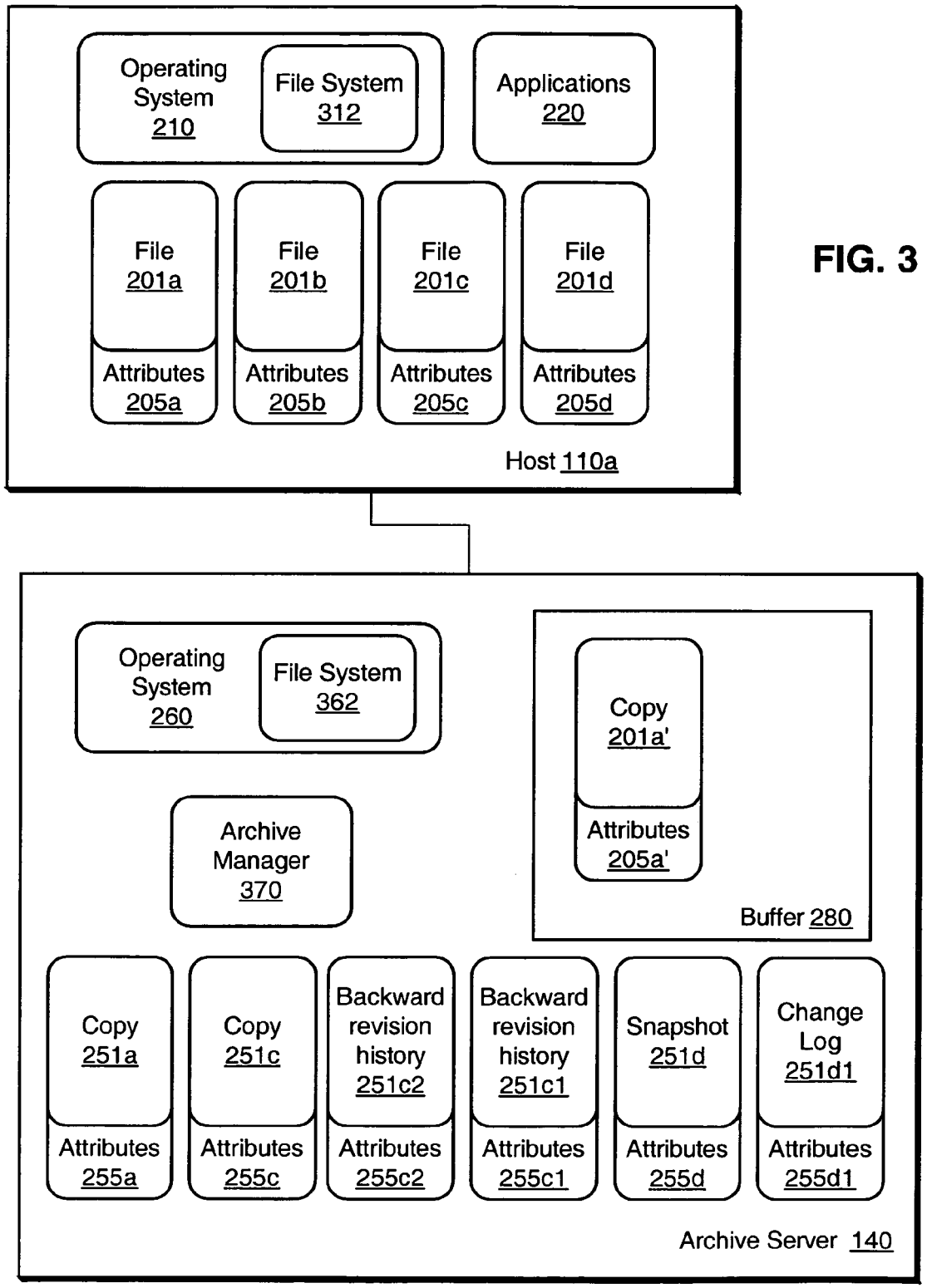
FIG. 3 is a block diagram of a second implementation of a host and an archive server.

FIG. 3 is a block diagram of a second implementation of the host 110a and the archive server 140. In this implementation, the archive server 140 and the host 110a include various elements corresponding to the elements discussed above with reference to FIG. 2. In addition, the implementation in FIG. 3 notes the presence of file attributes 205a-d (collectively, file attributes 205) that are associated respectively with the files 205a-d. Also illustrated are file attributes 255a, 255c, 255c2, 255c1, 255d and 255d1 (collectively, file attributes 255) that are associated respectively with the archive files 251a, 251c, 251c2, 251c1, 251d and 251d1.

The file attributes of a file may be information regarding the file, such as file size, file name, creation date, modification date, read/write/execute privileges, owner identity, group ownership characteristics and path information, among others. The file attributes may be among metadata for the file. The file attributes and/or the metadata for a file may generally be considered components of the file that are separate from the contents of the file. Nonetheless, the file attributes for a file may be bound to the file by the operating system 210. The file attributes for a file may generally include some information that is readily edited by users who have appropriate file access privileges for that file. For example, access privileges are generally an example of user-specified file attributes.

In the example of FIG. 3, an additional file attribute is included among the file attributes of each file on the host 110a. For each file, this additional attribute is user-specified information that indicates the archive policies for that file. Thus, the archive policy for a file may be readily updated by a user who has access to the host 110a. To update a file's archive policy, a user may change the appropriate file attribute for that file.

In situations where the additional file attribute is being made available on an existing file system, the file attribute for archive policy may be set to a default value for each existing file. Alternatively, the file attribute for archive policy may be an optional file attribute, with a default archive policy (e.g., single weekly backup with compression) applied to files that do not yet have a file attribute specified for their archive policies.

Since the archive policy is indicated by the file attributes in the example of FIG. 3, this example may do without a separate policy file (such as the policy file 201e or the copy of the policy file 251e from FIG. 2). The system may require other changes to support this implementation of the host 110a and the archive server 140. In this example, modified file systems 312 and 362 and a modified archive manager 370 are depicted in place of the corresponding elements 212, 262 and 270, respectively, from FIG. 2.

The archive manager 370 may be configured to create the archives 251 by copying the files 201 from the host 110a onto the archive server 140. Along with the files, the copying also brings the associated file attributes 205. The appropriate archiving policies may then be read from the copied file attributes and may be applied to the off-host copies of the files to generate the archives 251.

For example, the buffer 280 in FIG. 3 is illustrated as holding a recently obtained copy 201a' of file 201a. The file attributes 205a' are also present in the buffer 280, having been copied along with the file. The archive manager 370 may use the contents of the buffer 280 to make appropriate updates to the archives 251. For example, the archive manager 370 may read the archiving policies form the file attributes 205a' to determine the correct approach for archiving the buffered off-host copy 201a' in FIG. 3.

As discussed above, the archive manager 370 may initially copy the files 201 from the host 110a into the buffer 280. This copying may be performed on an ongoing basis, copying files or portions of files from the host 110a. Similarly, the copying procedure may also be performed on a block basis, such as in situations where the storage device is a block-level archiving appliance.

Users may set and update the archiving policies for each of the files 201. These policies may then instruct the archive server 140 on the appropriate approach to archiving each file. For example, the archiving policies may indicate whether to use single-copy backups, multiple-copy backups, no backups, snapshots, backward revision histories, forward revision histories, other approaches, or combination thereof for a particular file or group of files. The archiving policies may also indicate the frequency with which backups are to be made and replaced and the frequency and resolution with which revision histories are to be made and updated.

The archiving policies may also indicate whether CDP backups are desired, along with any desired CDP settings. CDP settings may include information such as the maximum quantity or age of CDP history information to be maintained for a given file.

The archiving policies may also indicate the desired storage medium for backup files, such as in situations where an archive server offers options for the type of storage medium for backups (e.g., tape storage, optical, or disk storage; fast or slow-access storage; high or low reliability media; high or low cost media; and/or backups with or without compression; among others). Such factors may be specified as quality of storage service (QOSS) indicators in the archiving policies.

It is also contemplated that more than one set of QOSS indicators may be used for a file, since separate QOSS indicators may be desired for different storage servers. For example, a user may wish for a file to have frequently updated CDP archiving on the CDP server 144. The user may also wish to maintain a second archiving of the file on the off-site storage server 175. This second archiving may be merely a single-copy backup of the file, with the single-copy backup being refreshed only monthly. The archiving policies may therefore allow two or more separate sets of QOSS indicators per file, with one set being used for each of several archive resources.

Still further, the archiving policies may also indicate that backups of a file may be omitted if not needed. For example, a weekly backup of a file designated for weekly archiving may ignore the file if the file has not been modified during the previous week. Similarly, the archiving policies for the file may indicate that if a file has changed only slightly in the previous week, then only a low-cost archive needs to be updated, but that a high-cost archive must also be updated if the file has changed substantially.

While only two components 110a and 140 are illustrated in FIGS. 2 and 3, it may be understood that these techniques may also be used for other storage systems (e.g., servers 144 and 170) and that the backup operations may be performed for other hosts (e.g., hosts 110b and 110c) instead of, or in addition to, the host 110a. One server may provide archive support for more than one host. Similarly, one host may use the archiving resources on more than one server.

Additionally, it is contemplated that instead of (or in addition to) archiving policies, other off-host processing policies may be communicated to an off-host device using the above techniques. Further, it is noted that the archiving policies or other off-host processing policies may apply to other data objects, instead of just files. The other data objects may be, for example, directories or folders, volumes, or virtual volumes, among others. In general, the above techniques may be useful in situations where attributes are relevant to an object on one node, host, server, or computing system, but are also used on another node, host, server, or computing system.

Other configurations of the system 100 are also contemplated. For example, in another implementation, the archive manager 270 or 370 may be configured to create the archives 251 by copying the files 201 from the host 110a onto a storage device that is separate from the archive server 140, such as the CDP server 144. In another example, the archive manager 270 or 370 may be resident on other storage devices, such as the CDP server 144 or the off-site storage 175, and may copy files into archives on those devices or others.

The archive manager 270 or 370 may be implemented as software that is executable on a processor on a storage device to perform the backup operations described above, using the policy information stored as file attributes (and/or stored in a policy file). The archive manager 270 or 370 may be deployed as a replacement for an existing archive management software on a storage device. It is also contemplated that the archive manager 270 or 370 may be implemented using an upgrade or a patch or an extension for an existing archive management software on a storage device. It is further contemplated that the archive manager 270 or 370 may be implemented in two parts: with an interface layer and a basic archiving block. The interface layer may be configured to obtain archive policies from the mirrored or copied data. The interface layer may then provide the archive policies to the basic archiving block. In such implementations, the interface layer may cooperate with an existing basic archiving block that is provided with a storage device.

Figure 4:
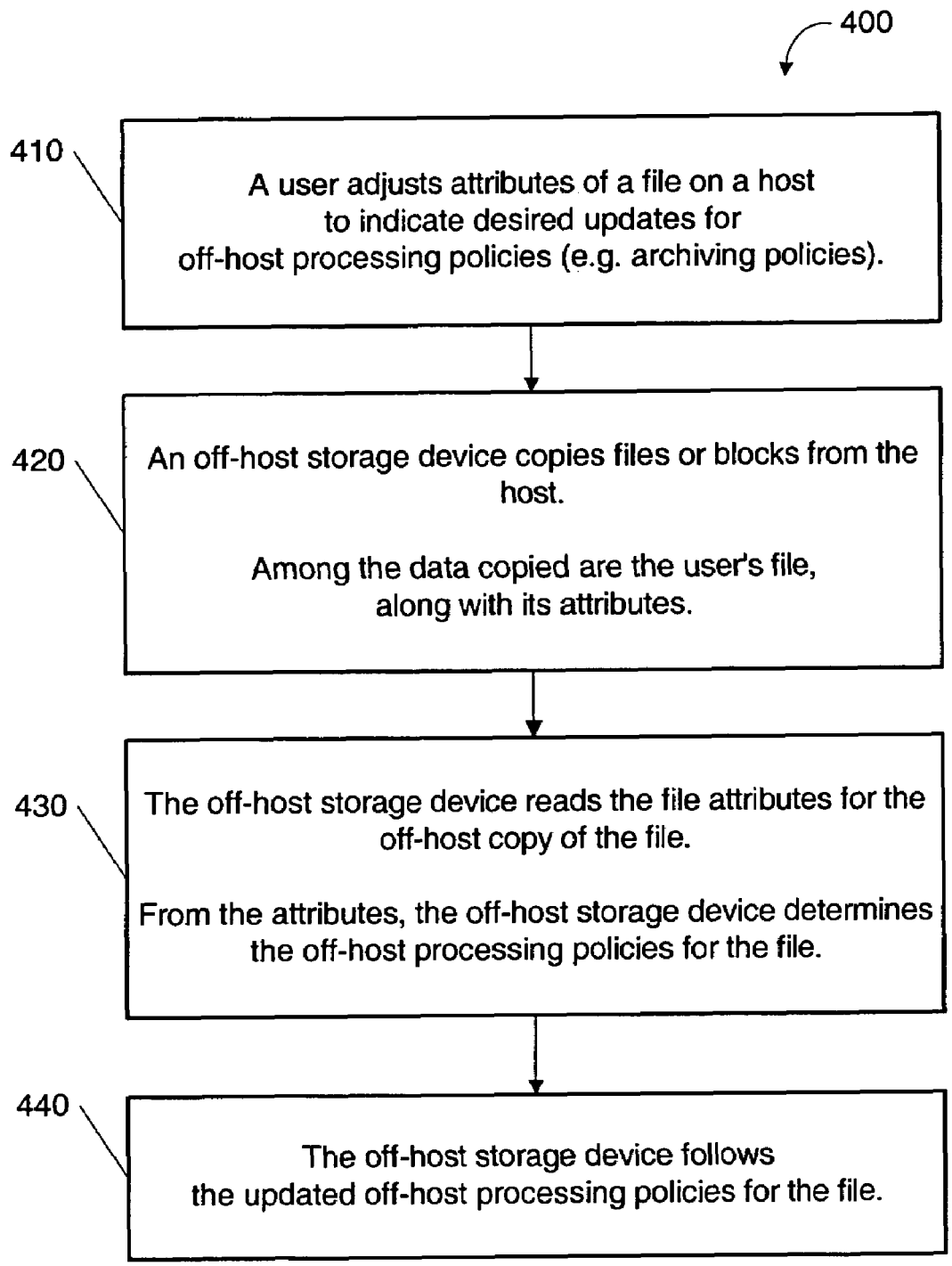
FIG. 4 illustrates a procedure for archiving data onto an off-host archive device.

FIG. 4 illustrates a procedure 400 for archiving data onto an off-host archive device. In act 410, a user adjusts attributes of a file on a host to indicate the desired off-host processing policies, such as archiving policies. This adjustment may be made, for example, using standard attribute commands made through a user interface on the host. In act 420, an off-host storage device copies files or blocks from the host. Among the data copied are the user's file, including the file contents and the file attributes. In act 430, the off-host storage device reads the file attributes for the off-host copy of the file. From the attributes, the off-host storage sever determines the off-host processing policies for the file. In act 440, the off-host storage device follows the updated off-host processing policies for the file, as specified by the user in act 410.

Figure 5:
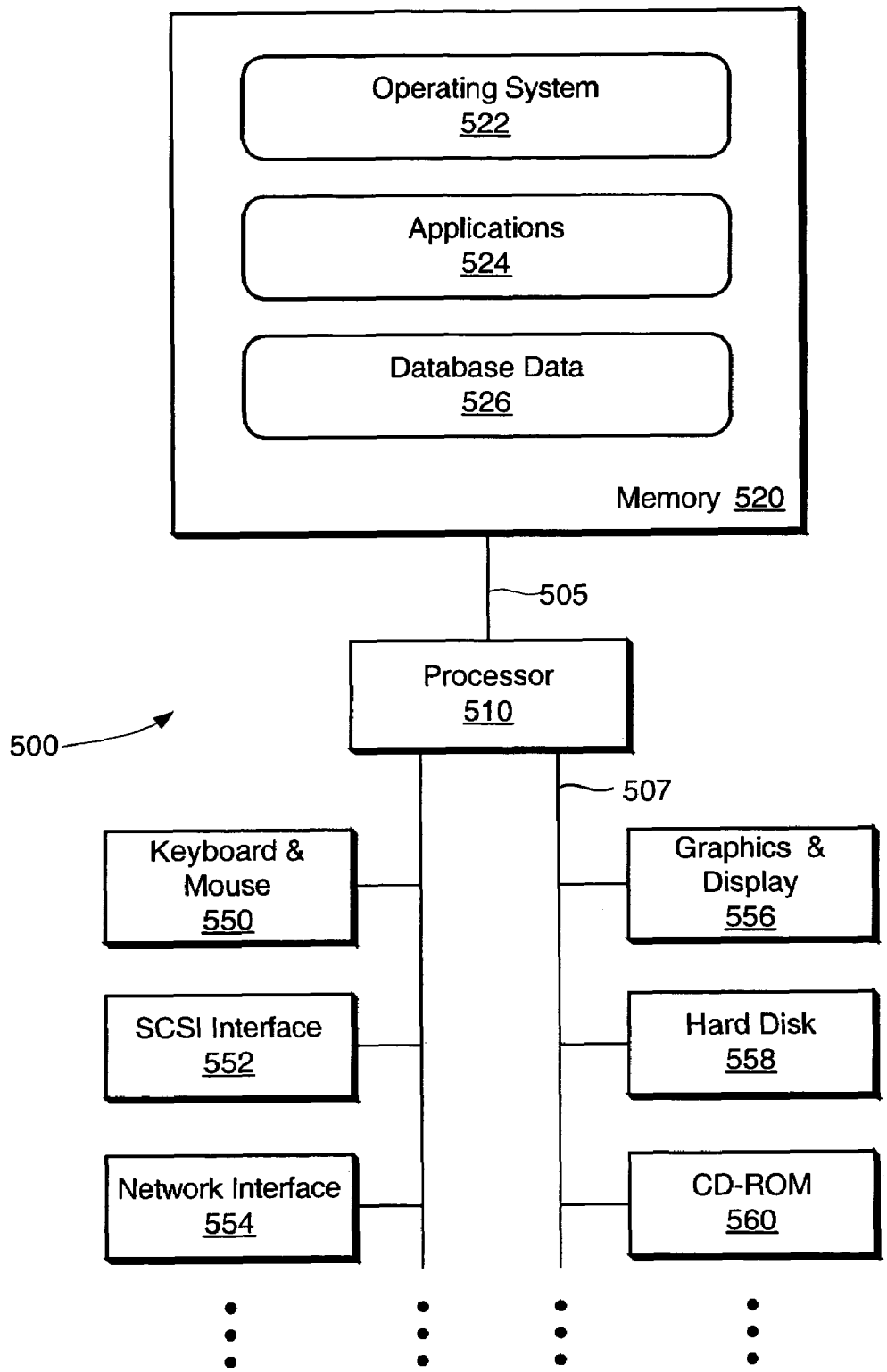
FIG. 5 is a block diagram of one implementation of a computer system.

FIG. 5 is a block diagram of one implementation of a computer system 500 that may be used for one or more of the techniques described herein. For example, the computer system 500 may be an implementation of one of the previously described hosts 110a-c, or clients 130a, 130b and 130c, or storage devices 140, 144, or 175. The computer system 500 may include a processor 510 and a memory 520 coupled together by a communications bus 505. The processor 510 may be a single processor or a number of individual processors working together. It is also contemplated that the processor 510 may be one or more virtual processors usable with interpreted languages. The memory 520 may be a random access memory (RAM) or some other dynamic storage device and may be capable of storing instructions to be executed by the processor, e.g., an operating system 522 and applications 524, as well as database data 526. The operating system 522 may include software for implementing a file system. The applications 524 may include archive management software, single-host or distributed applications, data backup applications, user interfaces and others. The memory 520 may also be used for storing temporary variables or other intermediate information during the execution of instructions by the processor 510.

The computer system 500 may also include devices such as a keyboard & mouse 550, a SCSI interface 552, a network interface 554, a graphics & display 556, a hard disk 558 and a CD-ROM 560, all of which are coupled to the processor 510 by a communications bus 507. It will be apparent to those having ordinary skill in the art that the computer system 500 may also include numerous elements not shown in the figure, such as additional storage devices, communications devices, input devices and output devices, as illustrated by the ellipsis shown.

FIGS. 1-4 illustrate some of the many operational examples of the techniques disclosed in the present application. Those having ordinary skill in the art will readily recognize that certain steps or operations described with respect to FIGS. 1-4 may be eliminated or taken in an alternate order. Moreover, the operations discussed with respect to FIGS. 1-4 may be implemented as one or more software programs for a computer system and encoded in a computer readable medium as instructions executable on one or more processors. The computer readable medium may include a solid-state storage medium, a magnetic storage medium, or an optical storage medium, or combinations thereof. The software programs may also be carried in a communications medium conveying signals encoding the instructions. Separate instances of these programs may be executed on separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above may be utilized with a variety of different storage devices and computing systems with variations in, for example, the number of servers and the types of operation of the computing system, e.g., various forms of archiving tools, storage virtualization, I/O operations and addressing techniques.

Those having ordinary skill in the art will readily recognize that the techniques and methods discussed above may be implemented in software using a variety of computer languages, including, for example, traditional computer languages such as assembly language, Pascal and C; object oriented languages such as C++, C# and Java; and scripting languages such as Perl and Tcl/Tk. Additionally, the software 522 or 524 may be provided to the computer system via a variety of computer readable media including electronic media (e.g., flash memory), magnetic storage media (e.g., the hard disk 558, a floppy disk, etc.), optical storage media (e.g., the CD-ROM 560). Communications media conveying signals encoding the instructions may also be used to provide the software 522 or 524 (e.g., via a network coupled to the network interface 554).

Although the present invention has been described in connection with several implementations, the invention is not intended to be limited to the specific forms set forth herein. On the contrary, it is intended to cover such alternatives, modifications and equivalents as can be reasonably included within the scope of the invention as defined by the appended claims.

What is claimed is:

1. A method comprising:
   copying data from a source system to a destination system, wherein
      the data comprises at least one data file, and
      the source system and destination system are communicatively coupled to one another;
   copying off-host processing properties from the source system to the destination system, wherein
      the off-host processing properties comprise archiving properties for the at least one data file, and
      the archiving properties comprise a continuous data protection (CDP) maintenance policy; and
   causing the destination system to process the data in accordance with the off-host processing properties.

2. The method of claim 1, wherein
   the copying the data comprises making a copy of the data on the destination system;
   the copying the off-host processing properties comprises making a copy of the off-host processing properties on the destination system; and
   the processing the data is performed by the destination system on the copy of the data in accordance with the copy of the off-host processing properties.

3. The method of claim 2, wherein the source and destination systems are coupled to one another through a network.

4. The method of claim 1, wherein
   the off-host processing properties comprise archiving properties, and
   the processing the data in accordance with the off-host processing properties comprises archiving the data in accordance with the archiving properties.

5. The method of claim 1, wherein
   the data comprises at least one data object, and
   the off-host processing properties comprise archiving properties for the at least one data object.

6. The method of claim 1, wherein
   the copying the data comprises copying the data onto a backup host; and
   the copying the off-host processing properties comprises copying the archiving properties onto the backup host.

7. The method of claim 1, wherein the archiving properties comprise one or more of:
   a do-not-archive indicator;
   an archiving frequency; and
   a quality of storage service (QOSS) indicator.

8. The method of claim 1, wherein
   the data comprises a data file and file attributes for the data file, and
   the file attributes for the data file comprise off-host processing properties for the data file.

9. The method of claim 1, wherein
   the data comprises a data file and metadata for the data file, and
   the metadata for the data file comprise off-host processing properties for the data file.

10. A system comprising:
a host, wherein the host comprises
a first processor, and
a first memory;
a backup server, wherein the backup server is communicatively coupled to the host and comprises
a second processor, and
a second memory; and
an archiving module, wherein
the archiving module is coupled to the host and to the backup server, and
the archiving module is configured to archive data from the first memory onto the second memory in accordance with archiving policies maintained in the first memory by virtue of being configured to
copy data from the host to the backup server, wherein the data comprises at least one data file,
copy off-host processing properties from the host to the backup server, wherein
the off-host processing properties comprise the archiving properties,
the archiving properties are for the at least one data file, and
the archiving properties comprise a continuous data protection (CDP) maintenance policy, and
process the data in accordance with the off-host processing properties.

11. The system of claim 10, wherein the archiving module is comprised in machine-readable instructions stored in the second memory, and where the computer-executable instructions are executable on the second processor.

12. The system of claim 10, wherein the archiving module is configured to archive files from the first memory onto the second memory in accordance with archiving policies maintained in the first memory.

13. The system of claim 10, wherein the archiving policies are stored in a policy database file in the first memory, and where the archiving module is configured to copy the policy database file from the first host onto the backup server.

14. The system of claim 10, wherein the archiving policies for a file is stored among file attributes of the file in the first memory, and where the archiving module is configured to copy the file attributes from the first host onto the backup server.

15. The system of claim 10, wherein the archiving policies comprise one or more of:
a do-not-archive indicator for a first file in the first memory;
an archiving frequency for the first file;
a quality of storage service (QOSS) indicator for the first file; or
a continuous data protection (CDP) maintenance policy for the first file.

16. The system of claim 10, wherein the archiving policies for a first file in the first memory are stored in the first memory as metadata of the first file.

17. The system of claim 10, wherein the archiving policies for a first file in the first memory are stored in the first memory as file attributes of the first file.

18. A computer program product comprising:
a first set of instructions, executable on a computer system, configured to manage a plurality of files;
a second set of instructions, executable on said computer system, configured to copy data to be archived from a source system to a destination system, wherein the data comprises at least one data file, and
the source system and destination system are communicatively coupled to one another;
a third set of instructions, executable on said computer system, configured to copy file properties from the source system to the destination system, wherein
the off-host processing properties comprise archiving properties for the at least one data file,
the archiving properties comprise a continuous data protection (CDP) maintenance policy, and
the file properties comprise archiving properties for at least one data file among the copied data;
a fourth set of instructions, executable on said computer system, configured to archive the data file in accordance with the archiving properties; and
a computer readable storage medium, wherein the computer program product is encoded on the computer readable storage medium.

19. The computer program product of claim 18, wherein:
the second set of instructions comprises
a first subset of instructions, executable on said computer system, configured to copy the data from a first host onto a second host;
the third set of instructions comprises
a second subset of instructions, executable on said computer system, configured to copy the file properties from the first host onto the second host; and
the first and second hosts are coupled through a network.

20. The computer program product of claim 18, where the file properties are stored as file attributes on the source system, and where the archiving properties comprise one or more of:
a do-not-archive indicator;
an archiving frequency;
a quality of storage service (QOSS) indicator; or
a continuous data protection (CDP) maintenance policy.

21. A system comprising:
a first data processing system comprising:
a first processor, and
a first memory;
a second data processing system, coupled to the first data processing system, the second data processing system comprising:
a second processor, and
a second memory; and
archiving means coupled to the first and second data processing systems, wherein
the archiving means is configured to archive data from the first memory onto the second memory in accordance with archiving policies maintained in the first memory by virtue of being configured to copy data from a source system to a destination system, wherein
the data comprises at least one data file, and
the source system and destination system are communicatively coupled to one another,
copy off-host processing properties from the source system to the destination system, wherein
the off-host processing properties comprise archiving properties for the at least one data file, and
the archiving properties comprise a continuous data protection (CDP) maintenance policy, and
process the data in accordance with the off-host processing properties.

* * * * *